United States Patent [19]
Pittet, Jr.

[11] 3,970,270
[45] July 20, 1976

[54] LOW SPEED AIRCRAFT
[76] Inventor: Rene E. Pittet, Jr., 537 N. Gordon St., Marshall, Mich. 49068
[22] Filed: Nov. 11, 1974
[21] Appl. No.: 522,606

[52] U.S. Cl. .................................... 244/5; 244/30; 244/125; 244/128
[51] Int. Cl.² ........................................ B64B 1/08
[58] Field of Search ................ 244/5, 12 C, 25, 125, 244/126, 128, 30

[56] References Cited
UNITED STATES PATENTS

| | | | |
|---|---|---|---|
| 1,424,491 | 8/1922 | Langevin | 244/5 |
| 1,679,565 | 8/1928 | Faber | 244/25 |
| 1,712,529 | 5/1929 | Tallei | 244/5 |
| 1,836,928 | 12/1931 | Mego | 244/5 |
| 1,840,902 | 1/1932 | Hicks | 244/55 |
| 2,332,648 | 10/1943 | Knight | 244/5 |
| 2,953,320 | 9/1960 | Parry | 244/12 C |
| 3,199,809 | 8/1965 | Modesti | 244/12 C |
| 3,820,744 | 6/1974 | Denton | 244/5 |

FOREIGN PATENTS OR APPLICATIONS

| | | | |
|---|---|---|---|
| 1,481,588 | 4/1969 | Germany | 244/5 |

OTHER PUBLICATIONS

Butz, "Controllable Re-Entry Techniques Probed," Aviation Week, Nov. 2, 1952 p. 103.

Primary Examiner—Trygve M. Blix
Assistant Examiner—Galen L. Barefoot
Attorney, Agent, or Firm—Beaman & Beaman

[57] ABSTRACT

An aircraft capable of flying at very low velocities utilizing a wing envelope of an aerodynamic configuration having cells filled with a lighter-than-air gas. In one embodiment the buoyancy of the wing is slightly less than the total weight of the aircraft wherein forward movement is required to provide lift. In another embodiment the buoyancy is greater than the aircraft weight wherein forward motion is required to produce universal control without the release of gas or ballast. The wing envelope is formed of a plurality of trussed members radially extending from an axis producing a plurality of cells covered by a lightweight high strength skin material, the aircraft being characterized by high strength, economy and efficiency of construction and efficiency of lift at low speeds.

4 Claims, 17 Drawing Figures

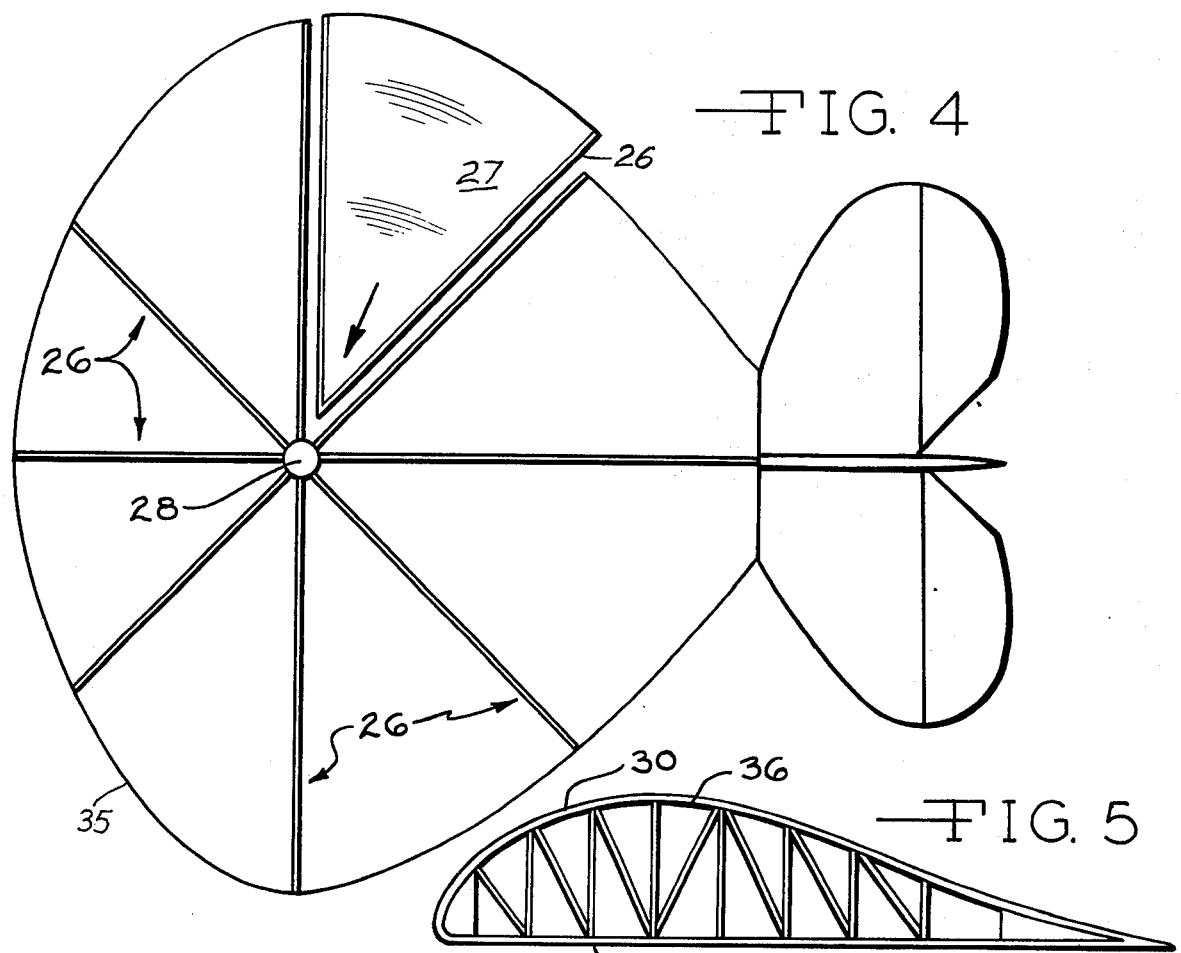
FIG. 4
FIG. 5
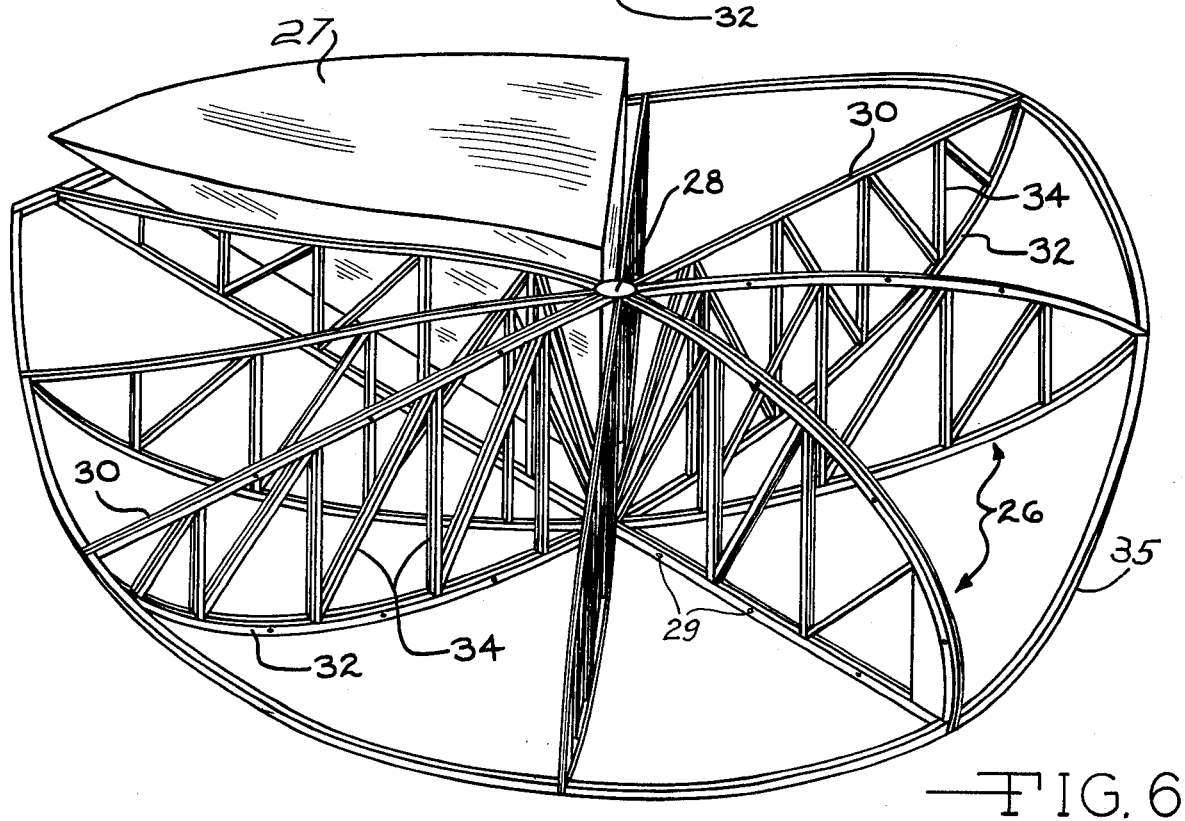
FIG. 6

LOW SPEED AIRCRAFT

BACKGROUND OF THE INVENTION

The invention pertains to low speed aircraft using lighter-than-air gas within an aerodynamically shaped airfoil envelope.

It has long been recognized that an aircraft using an airfoil envelope filled with a lighter-than-air gas can be used in a low speed aircraft, and reference is made to U.S. Pat. Nos. 1,424,491, 1,679,565, 1,841,815 and 1,845,251. Such aircraft utilizes the airfoil configuration of the gas envelope to provide additional lift, as well as confine the gas. However, such aircraft has not proven practical for a variety of reasons, and one of the greatest deterrents to further development of this type of aircraft lies in the inability to construct the airfoil envelope in an economical, lightweight and relatively low cost manner having sufficient strength to withstand rugged use.

Previously designed aircraft using a gas filled envelope were either too expensive to manufacture to be economically practical, of insufficient strength, or the construction of the envelope did not have the necessary characteristics to achieve both the advantage of the buoyancy of the gas, and the lifting characteristics of the airfoil.

SUMMARY OF THE INVENTION

It is an object of the invention to provide a low speed aircraft utilizing an airfoil lighter-than-air gas envelope wherein the envelope is of a lightweight, high strength and economically manufacturable form.

Another object of the invention is to provide a low speed aircraft envelope for a lighter-than-air gas wherein the envelope is formed of a plurality of segments defined by truss elements radially disposed about a central axis. The truss elements define separate gas cells, each cell employing an inner bag in order to provide constant volume at varying temperature and altitude.

An additional object of the invention is to provide a low speed aircraft having a gas envelope in the form of an airfoil wherein the envelope may be oriented to provide either a vertical or positive lift, or a downward or negative force, upon forward movement of the aircraft, depending upon the orientation of the airfoil.

The gas envelope airfoil in accord with the invention includes a central vertically disposed axial member from which radially extend a plurality of truss elements. The truss elements define the sides of a plurality of segments, each segment constituting a cell for receiving a lighter-than-air gas, such as helium or hydrogen.

The aircraft includes a passenger compartment affixed to the underside of the airfoil and rudder and elevator surfaces are located at the rear of the airfoil for control purposes.

Preferably, the segments of the airfoil envelope containing the lighter-than-air gas each include an inner bag for maintaining a relatively constant volume under varying temperature and altitude conditions, and the "skin" of the airfoil segments is formed of a corrugated or honeycombed material of high strength and light weight.

BRIEF DESCRIPTION OF THE DRAWINGS

The aforementioned objects and advantages of the invention will be appreciated from the following description and accompanying drawings wherein:

FIG. 4 is a top plan view of the aircraft illustrating the relationship of the segments of the airfoil, and showing one of the segments in a nonassembled relationship, FIG. 5 is a cross-sectional view of the airfoil envelope of the aircraft, FIG. 6 is a perspective view of the airfoil truss arrangement and relationship.

DESCRIPTION OF THE PREFERRED EMBODIMENTS

Figure 1:
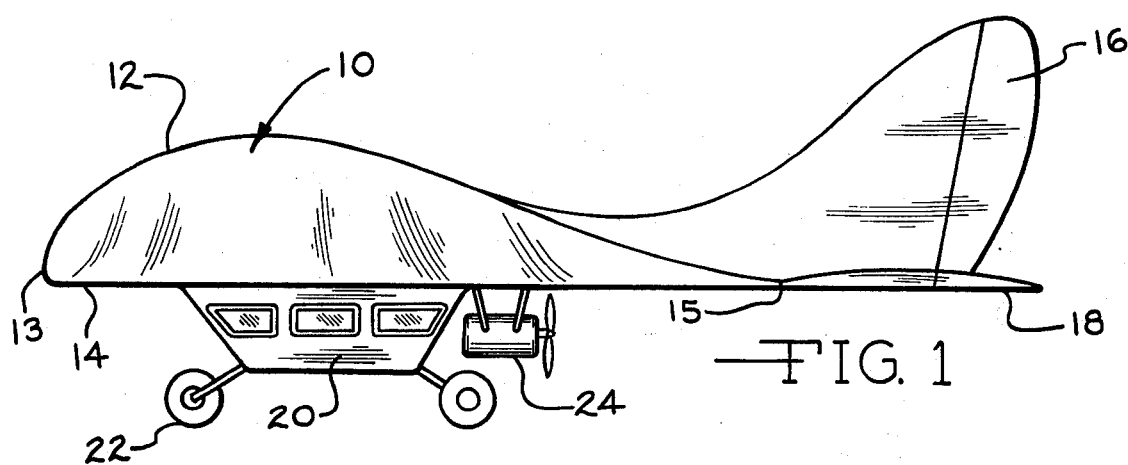
FIG. 1 is a side elevational view of an embodiment of a low speed aircraft in accord with my invention.
Figure 2:
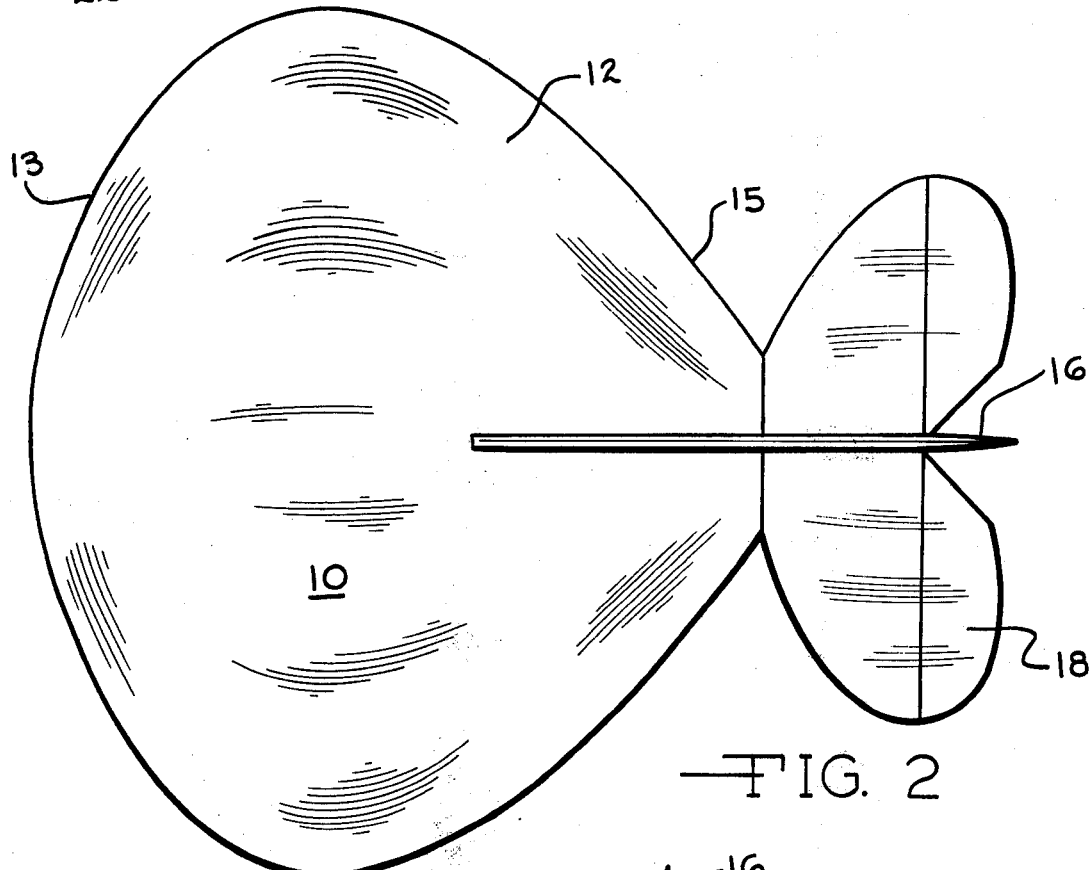
FIG. 2 is a top plan view of the aircraft of FIG. 1.
Figure 3:
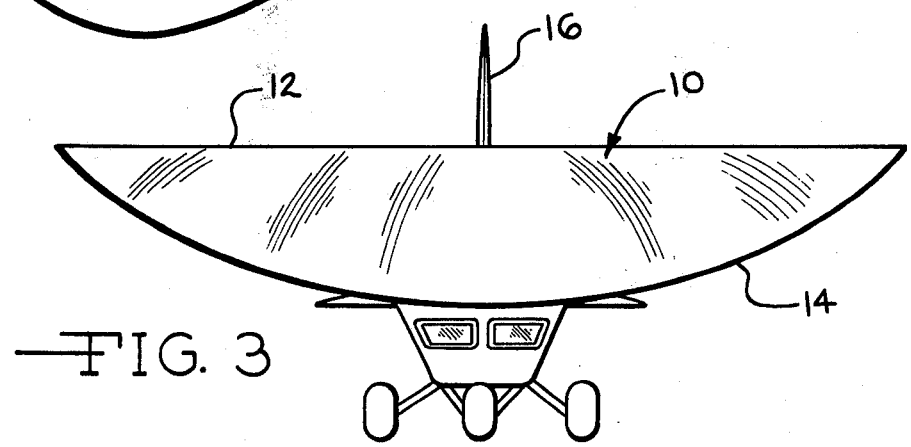
FIG. 3 is a front elevational view.

The basic feature of low speed aircraft constructed in accord with the inventive concept is the airfoil shaped envelope for the lighter-than-air gas. This envelope consists of a plurality of segments constituting gas cells, and the segments are assembled together about a central axis. As illustrated in FIGS. 1 through 6, an aircraft utilizing an airfoil envelope in accord with the invention includes the airfoil envelope 10 having the convex upper surface 12, and a lower surface 14. The upper surface 12 is convex and of an airfoil configuration in the direction of aircraft movement, i.e., left to right as viewed in FIG. 1. The lower surface 16 is substantially parallel to the direction of aircraft movement, but is convex in the lateral direction, as is apparent from FIG. 3. The envelope also includes a leading edge 13 and a trailing edge 15. The rear of the envelope 10 is provided with fixed conventional stabilizing surfaces and movable control surfaces which include a rudder 16 and elevators 18, and as will be later described, the elevators 18 are capable of pivoting in opposite directions about a common axis.

The passenger and load gondola 20 depends from below the envelope 10 having wheels 22 extending therefrom, and the motive means in the form of a gas motor 24 and propeller is affixed to the gondola, and may be either of the pusher type illustrated, or may be related upon the sides or front of the gondola to provide a motive force.

Figure 7:
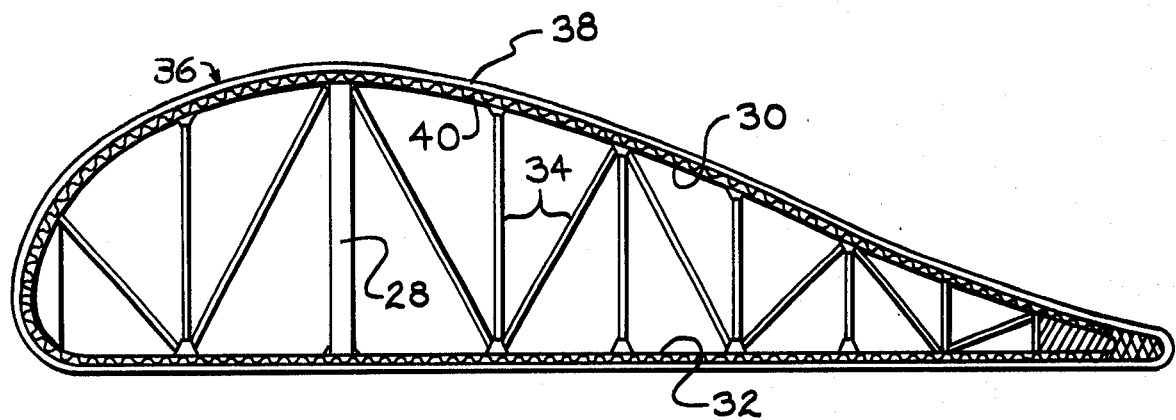
FIG. 7 is a longitudinal sectional view of the airfoil.

As best illustrated in FIGS. 5 through 7, the airfoil envelope 10 is defined by a plurality of truss members 26 radially disposed about the axis element 28, to which the trusses are attached. The trusses divide the airfoil into a plurality of "pie" shaped segments, and each segment is defined upon its side by a truss member 26 which includes an upper element 30, a lower element 32, and bracing 34, and a skin, generally defined at 36 extends between the truss members of a common segment. For purpose of illustration only the truss members are illustrated in FIG. 6 and one gas bag.

Figure 8:
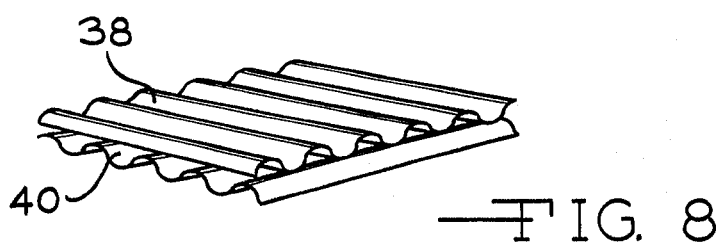
FIG. 8 is a perspective view of a detail of a corrugated skin construction for the airfoil segments.

The segments, between the side truss members, are covered with a lightweight skin 36 of high strength material. This skin can be in the form of a pair of layers 36 and 40 of corrugated material such as shown in FIG. 8 wherein the corrugated sheets may be formed of a lightweight synthetic plastic material, the corrugations of adjacent layers being disposed at right angles to each other, and the corrugations of the outer layer being positioned in the direction of airflow across the airfoil surfaces.

It is also contemplated that the skin of the airfoil segments could be formed of a variety of high strength lightweight materials such as Hexcel "Honeycomb" as sold by Hexcel Corporation of Dublin, Calif.

A pie-shaped flexible gas bag or cell 27 is located between adjacent truss 26 to receive the bouyant gas. Simple fastening means, such as bolts 29, are utilized to interconnect the adjacent airfoil segments at the truss, and interconnect the segments to the axis member 28, whereby the assembled segments together define the illustrated airfoil configuration. As peripheral rim 35 is used to interconnect the outer ends of the trusses 26 and provide a peripheral anchor for the outer skin.

Figure 11:
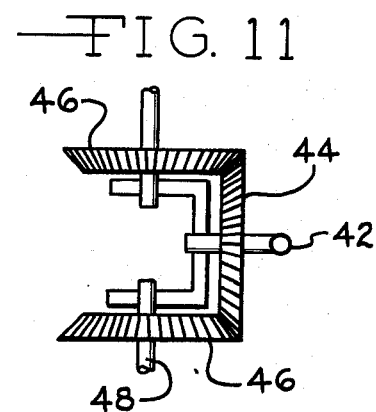
FIG. 11 is a detail view of the gearing arrangement of the control system of FIG. 10.
Figure 10:
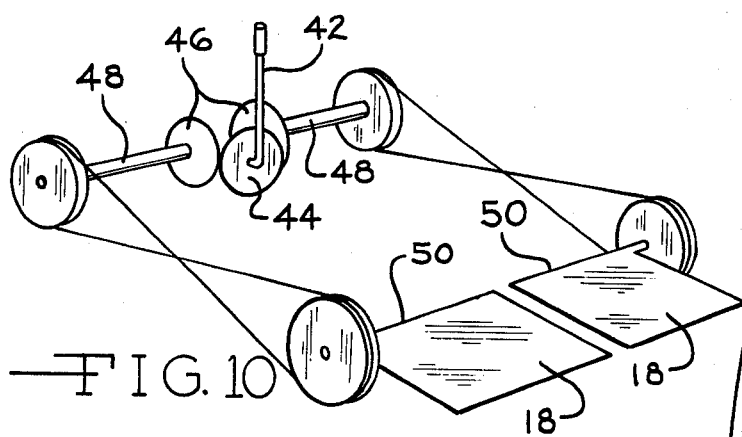
FIG. 10 is a schematic view illustrating a type of dual control surface drive for the aircraft elevators.

Control of the elevator surfaces 18 may be accomplished through the mechanism shown in FIGS. 10 and 11 wherein a single control handle 42 rotatively positions a gear 44 meshing with bevel gears 46. The gears 46 are mounted upon coaxial shafts 48 which are in turn connected to shafts 50 through a chain or cable transmission system represented at 52. The elevator surfaces 18 are mounted upon the shafts 50, which are coaxial, and thus a right to left rotation of the control handle 42 causes the gears 46 to rotate in opposite directions producing alternate directions of movement of the elevators 18 permit the aircraft to bank. A fore or aft movement of the controls 42 produces a like rotation of the gears 46 producing a simultaneous raising and lowering of the elevators to control the vertical movement of the aircraft. The rudder 16 may be controlled in a conventional manner.

In the aircraft configuration shown in FIGS. 1 through 6 the convex airfoil surface is disposed upwardly which produces an upward lifting force on the envelope as the aircraft moves in a forward direction. It is intended that the volume of the gas within the airfoil envelope be sufficient to almost support the gross weight of the aircraft, but the less than the actual gross weight whereby a forward motion of the aircraft is necessary to produce a lifting force. The forward motion of the aircraft will permit the aircraft to climb under control of the control surfaces of the rudder and elevator, and the airfoil shape of the envelope, in conjunction with the control surfaces and the distribution of weight between the buoyancy created by the gas and the airfoil permits excellent control, while producing a high lifting force at a low forward speed.

Figure 14:
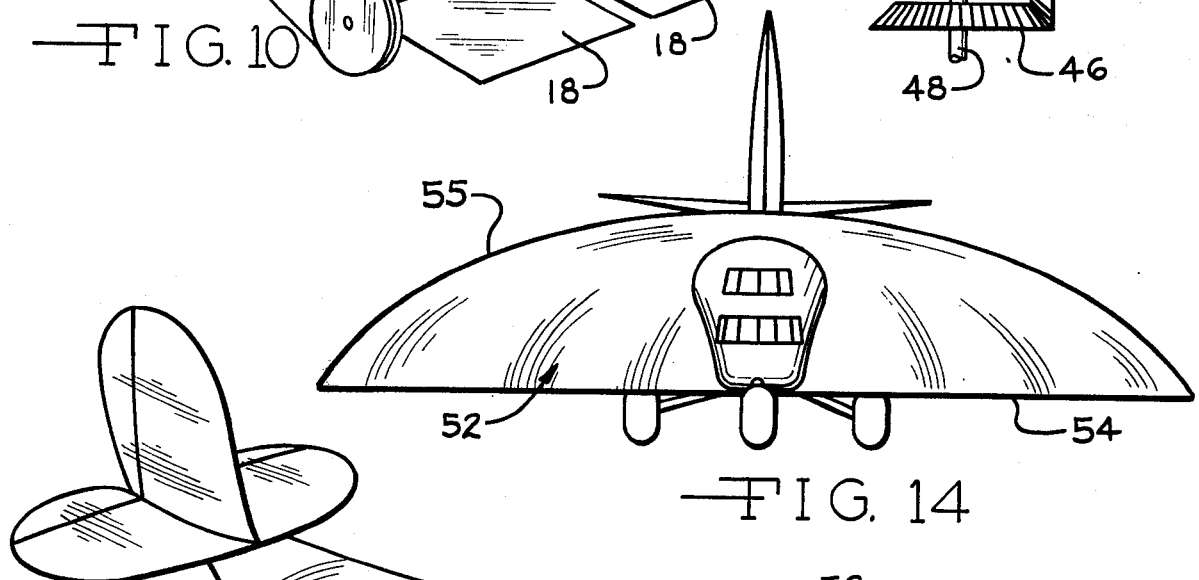
FIG. 14 is a front elevational view of the aircraft of FIG. 12, and FIGS. 15–17 are front, side and plan views, respectively, of a flying boat embodiment of the invention.
Figure 12:
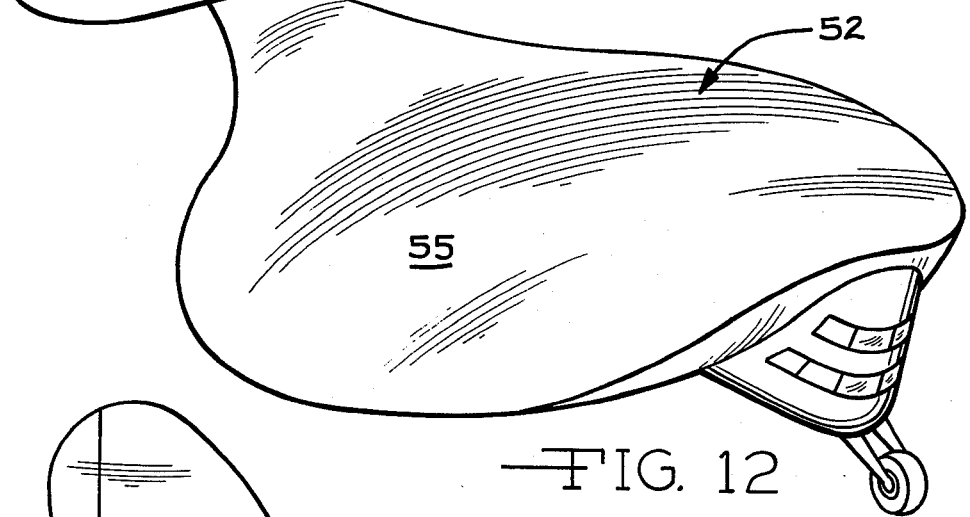
FIG. 12 is a perspective view of another embodiment of the aircraft in accord with the invention having a negative lifting force during forward motion.
Figure 13:
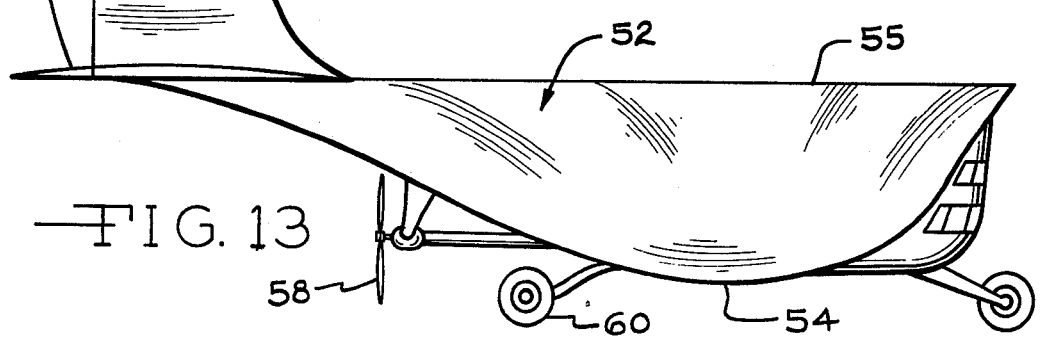
FIG. 13 is a side elevational view of the aircraft of FIG. 12.

The aircraft shown in FIGS. 12 through 14 uses an airfoil envelope 52 substantially similar to that shown in the previously described embodiment, but reversed in orientation. Thus, in this embodiment, the convex portion 54 of the airfoil envelope is disposed downwardly, while the upper surface 55 is substantially parallel to the direction of movement. The gondola 54 is illustrated as being mounted upon the front and forward portion of the envelope, and a pusher propeller 58 extends rearly from the aircraft, while the ground wheels 60 extend from both the gondola and the airfoil. Elevator and rudder control surfaces are located at the rear portion of the airfoil as in the previously described manner.

The airfoil envelope 52 of the embodiment of FIGS. 12 through 14 is constructed in a manner identical to that previously described, and the cells of the airfoil envelope are filled with a lighter-than-air gas. However, in this embodiment the volume of the gas within the envelope is sufficient to lift the gross weight of the aircraft without forward motion, and thus aircraft forward motion is required to provide the desired control of altitude without the release of ballast or gas.

The aircraft of FIGS. 12 through 14 provides unique control at low speeds, as low forward speeds permit both upward and downward aircraft movement under the influence of the control surfaces, and this type of aircraft is capable of accurate control under very low speeds.

Figure 16:
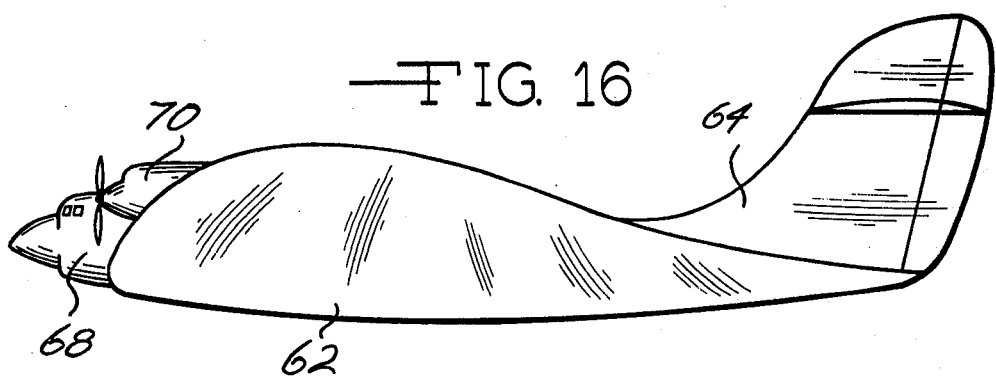
Figure 17:
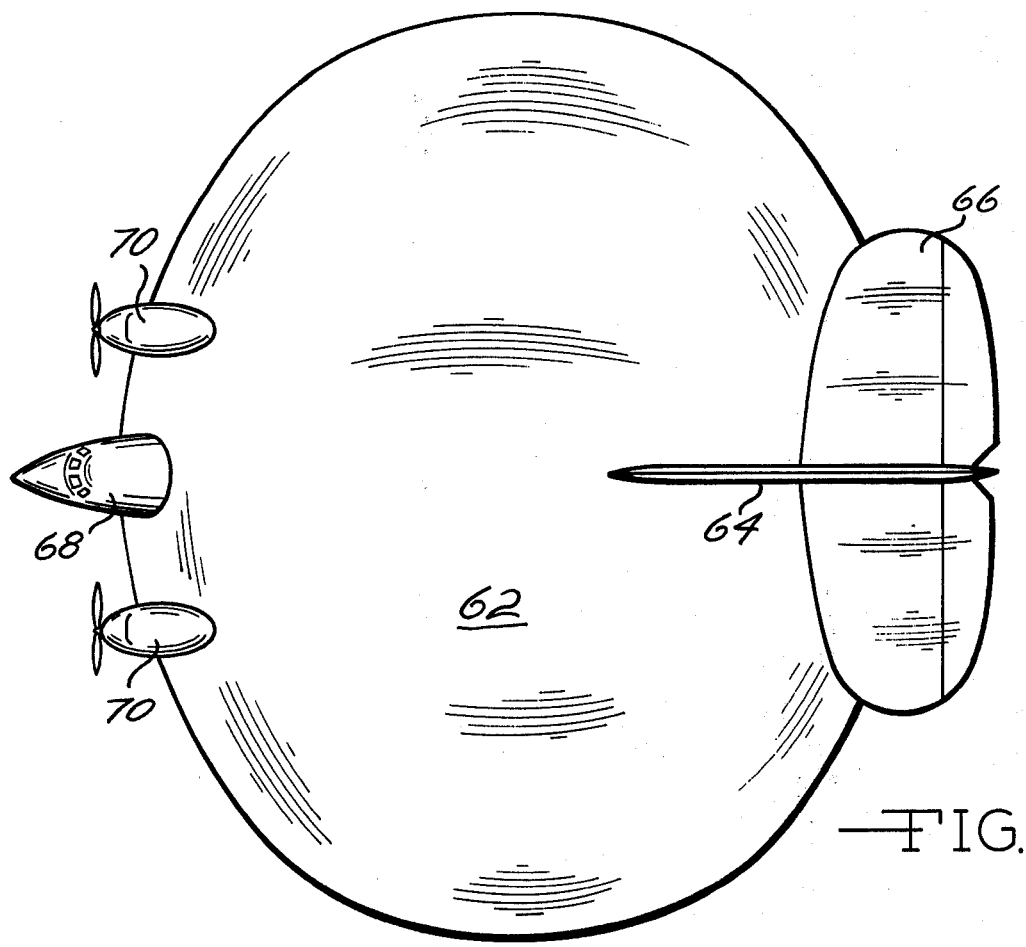
Figure 15:
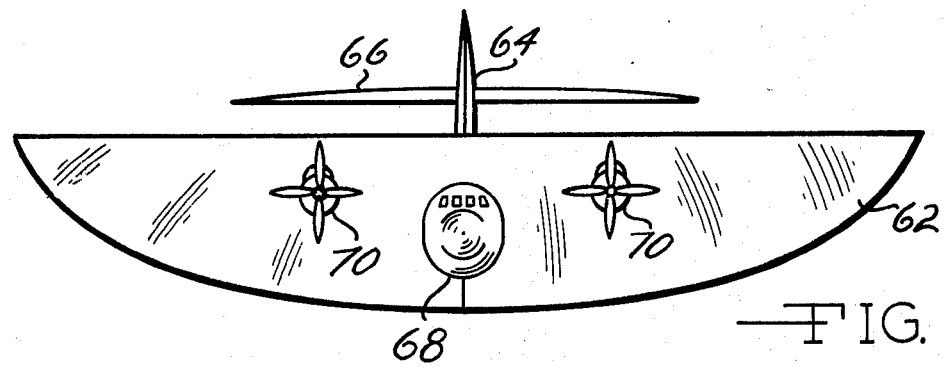

The inventive concepts of the invention may also be practiced in a flying boat version, and the embodiment illustrated in FIGS. 15 through 17 is directed towrd such a variation. In these figures the aircraft utilizes an envelope 62 similar in construction to the envelope 10 previously described. The envelope is formed of a plurality of truss members havine pie-shaped gas segments. However, as the lower surface of the envelope will be directly engaging the water upon which the aircraft floats and lands the envelope lower surface may be reinforced to a greater extent than with the embodiment illustrated in FIGS. 1 through 3.

In the flying boat version the rudder and elevator structure is preferably of the T type wherein the rudder 64 extends above the envelope within the vertical projection thereof, and the elevator surface 66 is disposed in a vertical location higher than the envelope 62, as will be appreciated from FIGS. 15 and 16. This type of elevator and rudder construction assures that these components will be well removed from water spray during landing and takeoff, and this type of tail assembly may also be used with the previously disclosed aircraft land versions.

The passenger and control compartment 68 is located at the forward portion of the envelope 62, as are the engines 70. This distribution of the passenger and control compartment, and engines, provides excellent weight distribution and simplifies access and maintenance.

As will be appreciated from FIG. 15, the convex or U lower configuration of the envelope in a lateral direction, and the forwardly curved leading edge of the envelope, FIG. 16, are conducive for use on water, and as the volume of the envelope displaces water for aircraft flotation purposes, and is simultaneously used to provide lift by displacing air, the envelope of the aircraft in accord with the invention function in a dual purpose when either floating, or in flight. In conventional flying boat aircraft the flotation volume is either defined by the fuselage hull, or separate floats, and such components do not add to the lift of the aircraft, but rather add to the air friction during flight. Thus, the dual function of the envelope 62 provides an improved efficiency and use of aircraft volume in this regard.

Of course, in the described embodiments the cells of the airfoil envelope are provided with the usual safety gas release devices commonly employed with the lighter-than-air aircraft, and various types of ballast may be employed, as desired.

Figure 9:
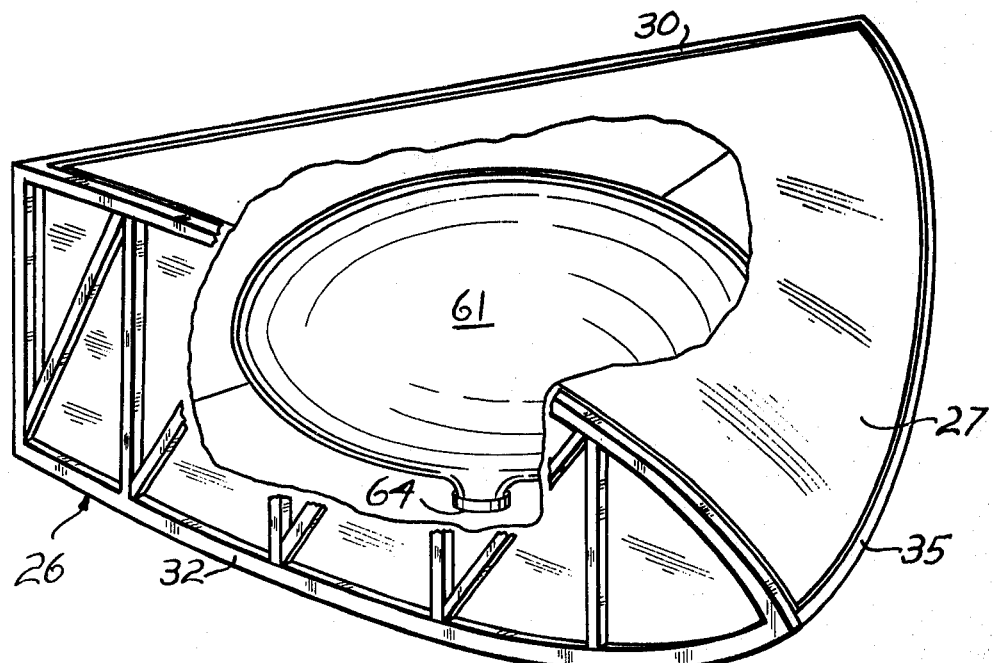
FIG. 9 is a perspective detail view of a single airfoil segment, partially in section.

Also, the cells defined by the gas bags of each segment may incorporate air bags 61, as shown in FIG. 9, having lower openings 64 which are valved to accept and release air to maintain a constant volume in the gas bag irrespective of temperature and ambient pressure conditions, as is known.

It is appreciated that various modifications to the inventive concept may be apparent to those skilled in the art without departing from the spirit and scope of the invention.

I claim:

1. A low speed aircraft comprising, in combination, a gas envelope having an airfoil configuration including a leading edge and a trailing edge, said envelope having a geometrical vertical central axis, said envelope being defined by a plurality of interconnected pie-shaped segments each having lateral sides and an apex, trusses defining said segments lateral sides, means interconnecting adjacent trusses of adjacent segments together to define said envelope whereby said segment apexes are located adjacent said central axis, said segments each including a gas bag disposed between the associated trusses, a lighter-than-air gas within said gas bags, control surfaces affixed to said envelope, a passenger compartment mounted on said envelope, and motor means mounted on said envelope for propelling said envelope in the direction of said leading edge.

2. In a low speed aircraft as in claim 1 wherein each segment is covered by a skin of corrugated sheet material, the corrugations of said skin being oriented parallel to the direction of aircraft movement during flight.

3. In a low speed aircraft as in claim 1 wherein said gas envelope includes a convex surface and an oppositely disposed air lifting surface, said convex surface being disposed upwardly whereby a lifting force is created on said air lifting surface during flight of said aircraft, the volume of said gas within said envelope being slightly less than that necessary to buoyantly lift said aircraft.

4. In a low speed aircraft as in claim 1 wherein said gas envelope includes a convex surface and an oppositely disposed air pressure surface, said air pressure surface being disposed upwardly whereby a downward force on said envelope is produced when said aircraft is in motion during flight, the gas volume of said envelope being sufficient to buoyantly lift said aircraft.

* * * * *